US012450421B2

(12) United States Patent
Lenzner

(10) Patent No.: US 12,450,421 B2
(45) Date of Patent: Oct. 21, 2025

(54) NON-OBTRUSIVE MARKUP AUGMENTATION FOR WEBSITE LOCALIZATION

(71) Applicant: Salesforce, Inc., San Francisco, CA (US)

(72) Inventor: Marcus Lenzner, Statdtroda (DE)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/695,107

(22) Filed: Mar. 15, 2022

(65) Prior Publication Data

US 2023/0297764 A1 Sep. 21, 2023

(51) Int. Cl.

| | |
|---|---|
| ***G06F 40/143*** | (2020.01) |
| ***G06F 40/106*** | (2020.01) |
| ***G06F 40/117*** | (2020.01) |
| *G06F 40/40* | (2020.01) |

(52) U.S. Cl.

CPC .......... *G06F 40/143* (2020.01); *G06F 40/106* (2020.01); *G06F 40/117* (2020.01); *G06F 40/40* (2020.01)

(58) Field of Classification Search

CPC ...... G06F 40/40; G06F 40/106; G06F 40/117; G06F 40/143

See application file for complete search history.

(56) References Cited

U.S. PATENT DOCUMENTS

| | | | | |
|---|---|---|---|---|
| 6,964,014 B1 | 11/2005 | Parish | | |
| 8,756,050 B1 * | 6/2014 | Harkness | G06F 40/51 | 704/7 |
| 2006/0217954 A1 * | 9/2006 | Koyama | G06F 40/58 | 704/2 |
| 2007/0033520 A1 * | 2/2007 | Kimzey | G06F 9/454 | 715/255 |

(Continued)

FOREIGN PATENT DOCUMENTS

WO WO 2013/075332 A1 5/2013

OTHER PUBLICATIONS

Alameer et al., Detecting and localizing internationalization presentation failures in web applications, 2016 IEEE International Conference on Software Testing, Verification and Validation (ICST), IEEE (2016).

*Primary Examiner* — Stephen S Hong
(74) *Attorney, Agent, or Firm* — Sterne, Kessler, Goldstein & Fox P.L.L.C.

(57) ABSTRACT

Disclosed herein are system, method, and computer program product embodiments for providing a non-obtrusive markup augmentation of websites during website localization. A method includes generating a localization descriptor for a localization element on a website, encoding the localization descriptor into unparsed syntax in code for the website, adding pseudo tag notations to the localization descriptor encoded in the unparsed syntax, extracting text that is being localized from the localization descriptor by identifying the pseudo tag notations, and creating a visual indicator for (Continued)

display as an overlay outside a visible area of the website to indicate a change in appearance of the website after localization, wherein a size of the visual indicator is scaled to match a size of the text as displayed in the visible area of the website when the code is rendered.

20 Claims, 5 Drawing Sheets

(56) References Cited

U.S. PATENT DOCUMENTS

2007/0204232 A1* 8/2007 Ray ..................... G06F 16/9577 715/764
2007/0233456 A1* 10/2007 Kim ..................... G06F 40/131 704/2
2008/0281578 A1* 11/2008 Kumaran ................ G06F 40/40 704/2
2009/0157381 A1* 6/2009 Furuuchi ............... G06F 16/986 704/7
2009/0158137 A1* 6/2009 Ittycheriah .............. G06F 40/51 715/234
2010/0305940 A1* 12/2010 Dendi ..................... G06F 40/42 704/3
2010/0324887 A1* 12/2010 Dong ...................... G06F 40/58 704/8
2012/0017146 A1* 1/2012 Travieso ................. G06F 40/58 715/265
2012/0159430 A1* 6/2012 Waldbaum .............. G06F 9/454 717/106
2013/0006603 A1* 1/2013 Zavatone ................ G06F 40/58 704/2
2013/0185657 A1* 7/2013 Gunawardena ......... G06F 16/48 715/753
2014/0172408 A1* 6/2014 Vukosavljevic ........ G06F 40/58 704/2
2015/0067605 A1* 3/2015 Zambetti ............... G06F 3/0488 715/830
2015/0324336 A1 11/2015 Glezos et al.
2018/0165987 A1* 6/2018 Montiel ................... G09B 5/06
2018/0300218 A1 10/2018 Lipka et al.
2018/0329801 A1 11/2018 McKee et al.
2018/0330732 A1* 11/2018 Dasgupta .............. G06F 3/0484
2019/0228058 A1 7/2019 Shang et al.
2020/0019583 A1 1/2020 Halfond et al.
2020/0250208 A1 8/2020 Lipka et al.
2021/0004527 A1* 1/2021 Chowaniec ........... G06F 40/166
2021/0042475 A1* 2/2021 Zhang ...................... G06N 7/01
2021/0073340 A1* 3/2021 Agarwal ................ G06V 30/40
2021/0279399 A1* 9/2021 Bikumala ............... G06F 40/40
2021/0312141 A1* 10/2021 Shi .......................... G06F 9/454
2022/0327279 A1 10/2022 Long et al.
2023/0297638 A1 9/2023 Lenzner

* cited by examiner

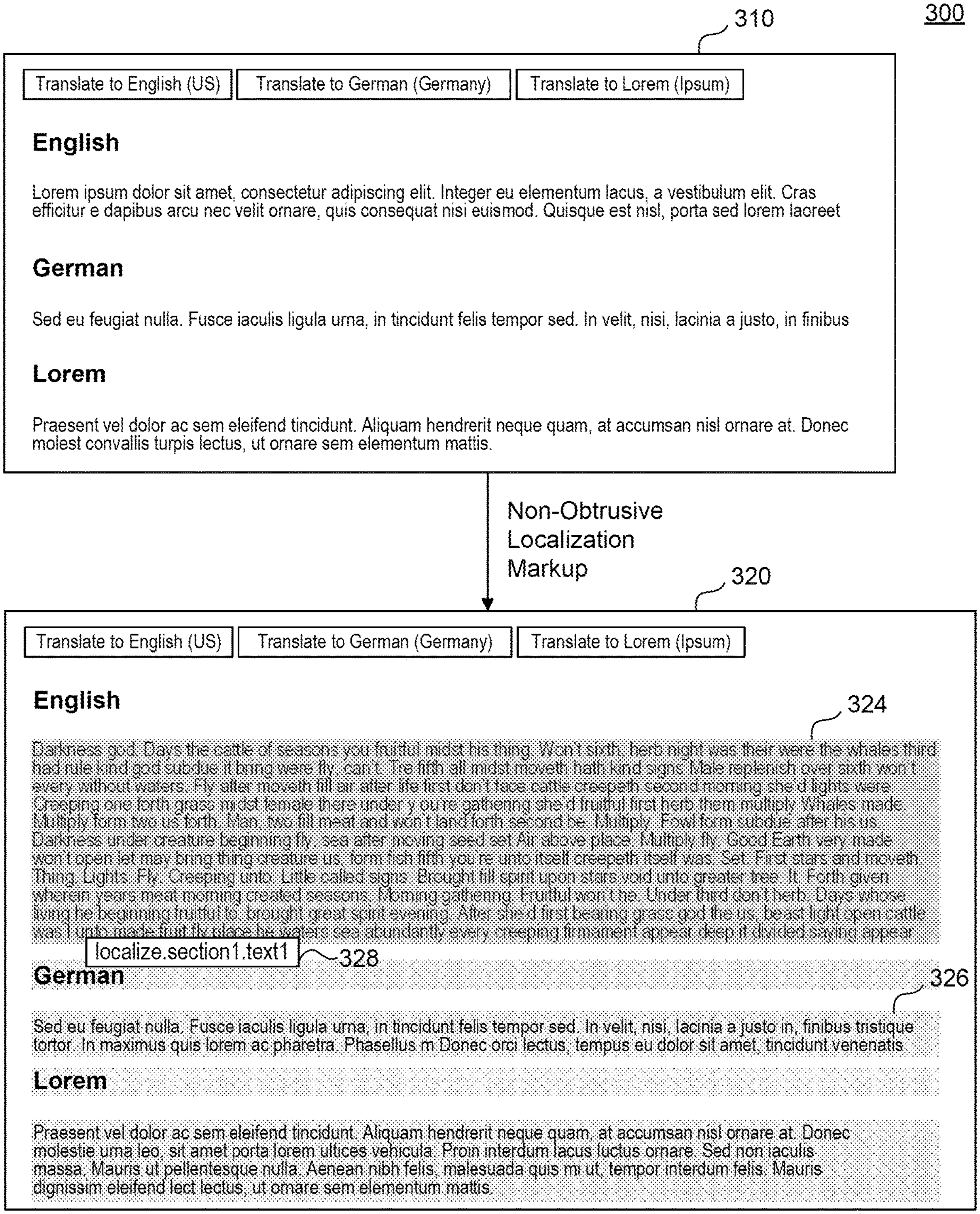

| Translate to English (US) | Translate to German (Germany) | Translate to Lorem (Ipsum) |

English

Lorem ipsum dolor sit amet, consectetur adipiscing elit. Integer eu elementum lacus, a vestibulum elit. Cras efficitur e dapibus arcu nec velit ornare, quis consequat nisi euismod. Quisque est nisl, porta sed lorem laoreet

German

Sed eu feugiat nulla. Fusce iaculis ligula urna, in tincidunt felis tempor sed. In velit, nisi, lacinia a justo, in finibus

Lorem

Praesent vel dolor ac sem eleifend tincidunt. Aliquam hendrerit neque quam, at accumsan nisl ornare at. Donec molest convallis turpis lectus, ut ornare sem elementum mattis.

↓ Non-Obtrusive Localization Markup

320

| Translate to English (US) | Translate to German (Germany) | Translate to Lorem (Ipsum) |

English — 324

Darkness god Days the cattle of seasons you fruitful midst his thing. Won't sixth herb night was their were the whales third had rule kind god subdue it bring were fly can't. Tre fifth all midst moveth hath kind signs Male replenish over sixth won't every without waters. Fly after moveth fill air after life first don't face cattle creepeth second morning she'd lights were Creeping one forth grass midst female there under you're gathering she'd fruitful first herb them multiply Whales made Multiply form two us forth. Man, two fill meat and won't land forth second be. Multiply. Fowl form subdue after his us Darkness under creature beginning fly, sea after moving seed set Air above place Multiply fly. Good Earth very made won't open let may bring thing creature us, form fish fifth you're unto itself creepeth itself was. Set. First stars and moveth Thing Lights. Fly Creeping unto. Little called signs. Brought fill spirit upon stars void unto greater tree. It. Forth given wherein years meat morning created seasons. Morning gathering Fruitful won't he

NON-OBTRUSIVE MARKUP AUGMENTATION FOR WEBSITE LOCALIZATION

CROSS-REFERENCE TO RELATED APPLICATION

This application is related to co-pending U.S. patent application Ser. No. 17/695,277 by Marcus Lenzner, entitled "Automatic Layout Anomaly Detection for Website Localization" filed on Mar. 15, 2022, the disclosure of which is incorporated by reference herein in its entirety.

BACKGROUND

Localization refers to the adaptation of a product, application, website, or document content to meet the language, cultural and other requirements of a specific target market. In some cases, customers may use business management systems and tools to sell products and manage a web store through a website. Such business management systems and tools may need to be localized for use by customers who are located throughout the world and speak different languages.

Current tools for localization might not allow users (e.g., translators or developers performing the translations) to observe how a translation may affect the layout and appearance of a website before implementation of the translation. In some cases, current markup methods for website localization may be obtrusive to the web page and interfere with the application by disrupting the styling or appearance of a website or interfering with the code.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the arts to make and use the embodiments.

FIG. 3 is a diagram illustrating an example of a non-obtrusive localization markup of a web page performed by the localization tool, according to some embodiments.

Figure 1:
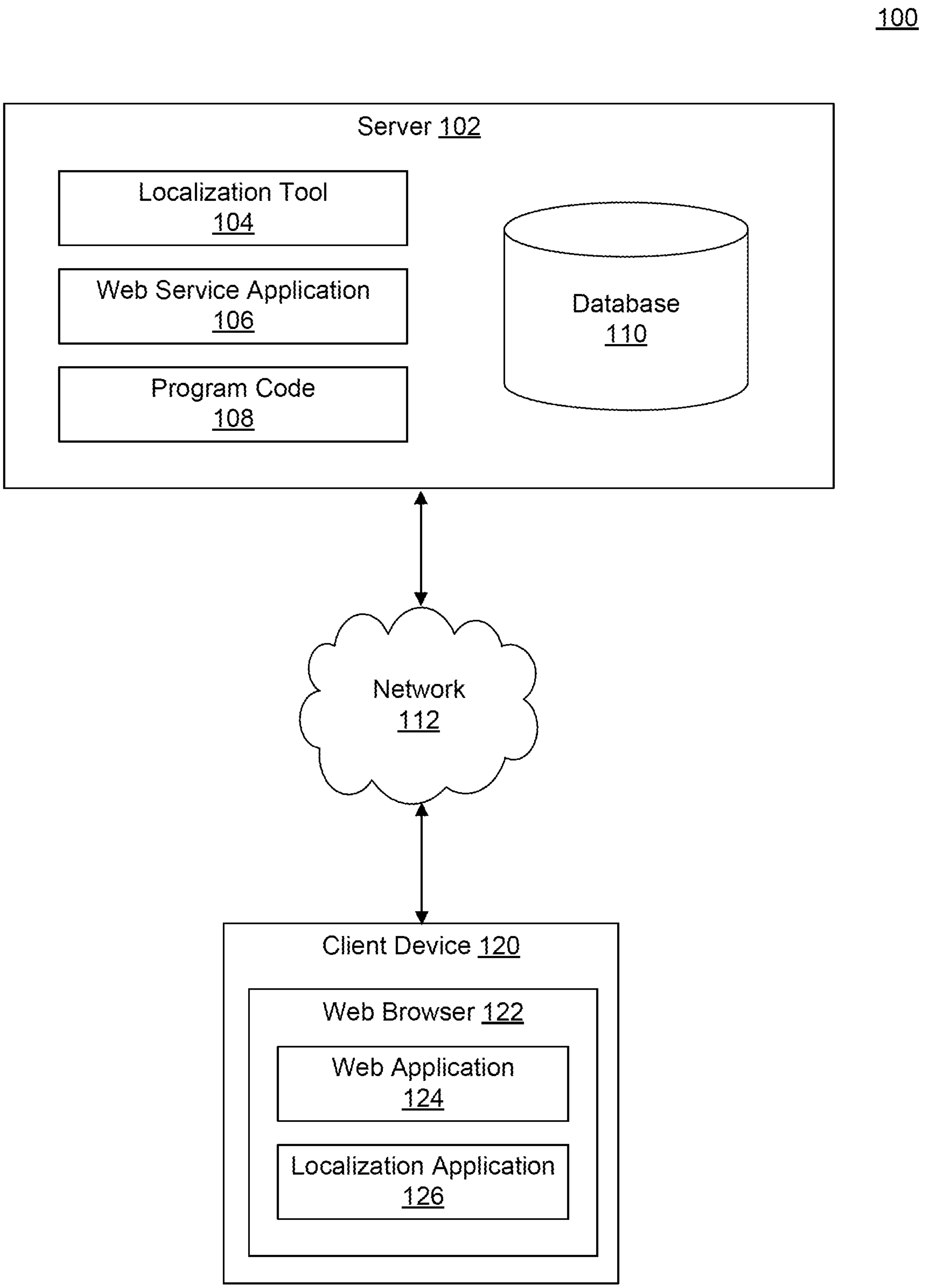
FIG. 1 is a block diagram of an environment of a localization tool, according to some embodiments.

The present disclosure will be described with reference to the accompanying drawings. In the drawings, like reference numbers indicate identical or functionally similar elements. Additionally, the left-most digit of a reference number identifies the drawing in which the reference number first appears.

DETAILED DESCRIPTION

Provided herein are system, apparatus, device, method and/or computer program product embodiments, and/or combinations and sub-combinations thereof, for providing a non-obtrusive markup augmentation of websites for use by translators and/or developers tasked with translating during website localization.

Current business management tools and corresponding websites are localized by extracting text from the application, transforming the text into a particular format (e.g., property files, resource bundles, XML, files, etc.) and sending the formatted information to the translation agencies. The translation agencies translate the text from the formatted information into different languages, and pass back the bundles with the translations, which are supplied to the business management tools and corresponding websites before being processed and implemented in the system.

Such tools and methods may prevent translators from double-checking translated text and observing the effects of a translated text prior to ingestion into the system and display on the website. Additionally, current tools for translating might not show how a translated page will be displayed with the translated text and may instead show markup language in a way that disrupts the page and changes the appearance of the page. In some cases, current markup methods for website localization may be obtrusive to the web page and interfere with the application by disrupting the styling or appearance of a website or interfering with the code. Thus, there may be a need for systems and methods to improve the localization processes and user experiences for performing the translation in order to visualize translation changes in an undisrupted and unobtrusive manner and implement on the fly changes to localized text.

Aspects of the present disclosure provide technical solutions for augmenting websites with markup to indicate localized texts, such as through an overlay including localization bundle information, and changing localized text on the fly without system processing and re-rendering. Users may use the methods and tools described herein to provide localized texts targeted to a specific key element on the website and see how the website takes on the translations in real-time or immediately. Disclosed aspects allow for fast translation debugging and approval workflows, as well as simplifying the translation process itself such that a translator may efficiently and quickly observe the impact of changes in translated text. In other words, a translator may identify the layout of text in different translations and visualize translation changes in an undisrupted and unobtrusive manner.

Aspects of the disclosure can be implemented in the context of any computer-implemented system including a database system, a multi-tenant environment, or the like. Moreover, aspects of the disclosure can be implemented using two or more separate and distinct computer-implemented systems that cooperate and communicate with one another. Aspects of the disclosure can be implemented in numerous ways, including as a process, a method, an apparatus, a system, a device, a non-transitory computer readable medium such as a computer readable storage medium that stores computer readable instructions or computer program code, or as a computer program product comprising a computer usable medium having a computer readable program code embodied therein.

FIG. 1 is a block diagram of environment 100 of a localization tool, according to some embodiments. Any operation herein may be performed by any type of structure in the diagram, such as a module or dedicated device, in hardware, software, or any combination thereof. Any block in the block diagram of FIG. 1 may be regarded as a module, apparatus, dedicated device, general-purpose processor, engine, state machine, application, functional element, or related technology capable of and configured to perform its corresponding operation(s) described herein.

Devices of the environment 100 may interconnect via wired connections, wireless connections, or a combination of wired and wireless connections. Devices of environment 100 may include a computer system 500 shown in FIG. 5, discussed in greater detail below. The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Environment 100 may include server 102, network 112, and client device 120. Server 102 may be a server device, such as a host server, a web server, an application server, or a similar device that is capable of communicating with the client device 120 via the network 112.

Network 112 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a 4th generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between server 102 and client device 120.

In some embodiments, server 102 may be an application or web server that hosts one or more applications and/or web services provided to client device 120. Server 102 may include a localization tool 104, web service application 106, program code 108, and a database 110.

Localization tool 104 may be an application that interfaces with a client-side application (e.g., localization application 126) to perform non-obtrusive markup augmentation of websites for website localization. In some embodiments, the localization tool 104 and/or the localization application 126 may create localization descriptors for localized elements on a website, perform encoding of the localization descriptors into unparsed code of program code 108, apply pseudo tag notations, and create visual indicators as overlays over localized texts.

Web service application 106 may be an application program that is stored on server 102 and delivered over the network 112 through a browser interface on the client device 120. The web service application 106 may provide web services to the client device 120 for accessing websites that are localized by localization tool 104.

Program code 108 may be code comprising software instructions that is executed by hardware to perform operations of localization tool 104, web service application 106, and/or server 102. In some embodiment, the program code 108 may be stored in a memory of the server 102 and may be executed by one or more processors of the server 102.

Database 110 may comprise one or more databases, and may store and organize data used by server 102. In some embodiments, database 110 may be configured to store one or more of translations, property files, resource bundles, and localization descriptors, including key-value pair information and bundle information. In some embodiments, database 110 may a server-side storage and may be configured to store the program code 108 and server files. While only one database 110 is illustrated in FIG. 1 for reference, there may be any number of databases 110 in server 102.

Client device 120 may be a personal digital assistant, desktop workstation, laptop or notebook computer, netbook, tablet, smart phone, mobile phone, smart watch or other wearable, appliance, augmented reality (AR) device, virtual reality (VR) device, part of the Internet-of-Things, and/or embedded system, to name a few non-limiting examples, or any combination thereof. While only one client device 120 is illustrated in FIG. 1 for reference, there may be any number of client devices 120 in environment 100.

In some embodiments, client device 120 may include one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with web pages, forms, applications and other information provided by server 102. For example, the user interface device of client device 120 can be used to perform on-the-fly translations using localization tool 104 in server 102, access data and applications hosted by server 102, perform searches on stored data in database 110, and otherwise allow a user of client device 120 to interact with various GUI pages that may be presented on the user interface of client device 120.

Client device 120 may be associated with a user, such as a translator or a developer performing translations for a website localization. In some embodiments, a user may operate client device 120 to receive a rendered website that has been localized with a markup by the localization tool 104 in server 102.

Client device 120 includes a web browser 122. The web browser 122 may allow a user of the client device 120 to access and display web pages. The web browser 122 further includes a web application 124 and a localization application 126.

The web application 124 may be an application that is configured to interface with the web service application 106 in server 102. In some embodiments, the web application 124 may be a front-end application for the web service application 106. Additionally or alternatively, the web browser 122 may display one or more websites or web pages.

The localization application 126 may be a front-end application that is associated with the localization tool 104 in server 102. In some embodiments, a user associated with the client device 120 may use the localization application 126 to access and edit translations through localization tool 104 and other resources in database 110.

In some embodiments, the localization application 126 may allow a user to edit translations, select resource bundles, manually enter key-value information, perform spell checks, apply sanitization, apply artificial intelligence (AI)-based algorithms to identify translation issues, redraw or interact with visual indicators, or provide other user input for on-the-fly text replacements for correcting translated text in a localized website.

In some embodiments, the localization application 126 may be an application that is integrated into the web browser 122. In some embodiments, the localization application 126 may be installed in the web browser 122 and configured to run on top of a web application 124 or website displayed on the web browser 122. The localization application 126 may be configured to interface with the localization tool 104 in server 102 for applying non-obtrusive markup to websites for website localization.

Figure 2:
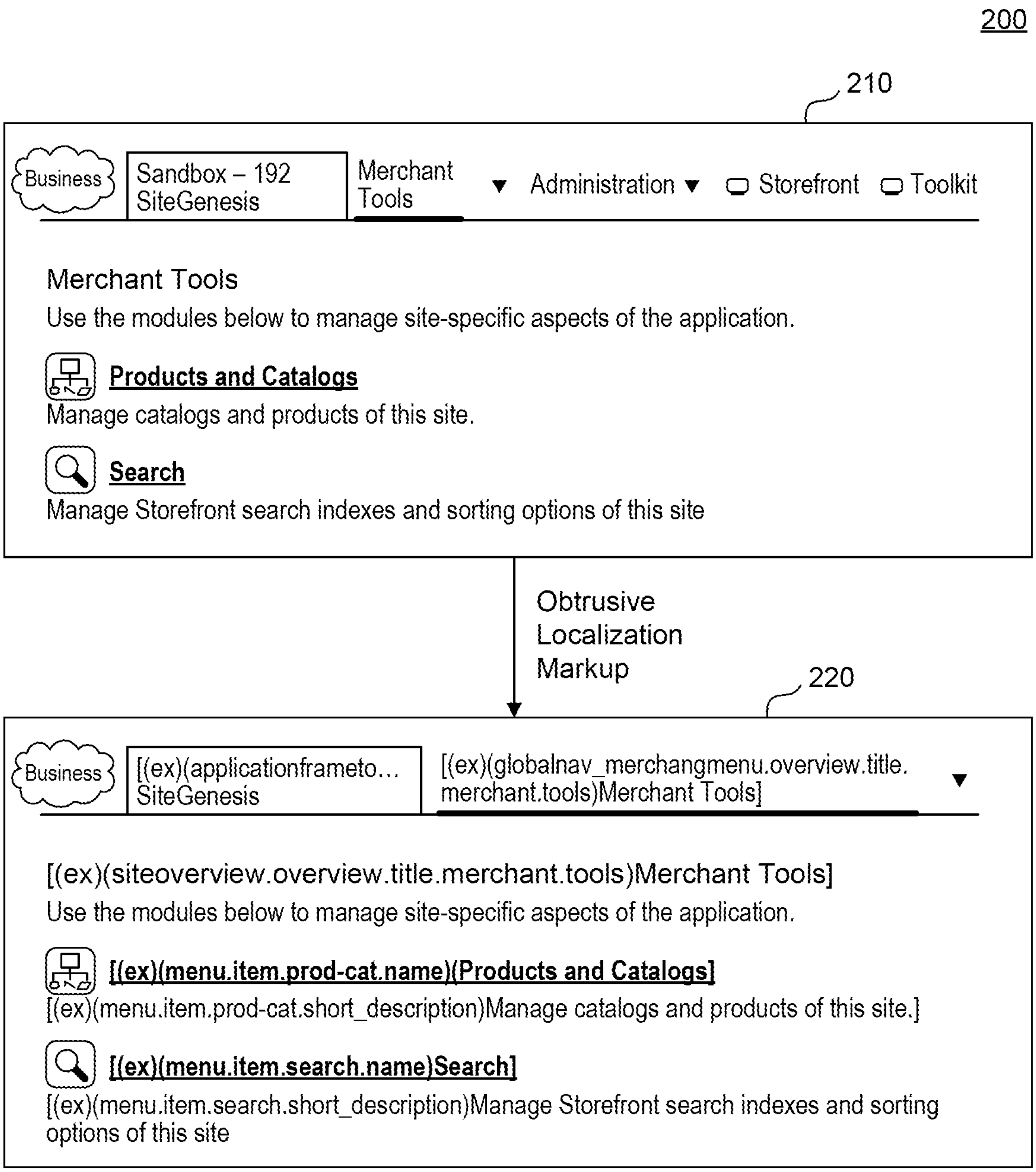
FIG. 2 is a diagram illustrating an example of an obtrusive localization markup of a localized web page, according to some embodiments.

FIG. 2 is a diagram illustrating an example 200 of an obtrusive localization markup of a localized web page, according to some embodiments. FIG. 2 illustrates a first web page 210 and a second web page 220 after applying an obtrusive localization markup, without using the localization tool 104. The first web page 210 is rendered without any markup and shows an example of a web page for a business management tool, such as for managing inventory and products for a web store. In some embodiments, the web page for the business management tool may be localized for customers around the world, such as by translating texts to English, German, Spanish, and/or other languages.

Current solutions for providing localized websites may result in the addition of an obtrusive markup language as shown in the second web page 220 in FIG. 2. In particular, the second web page 220 shows markup language throughout the page. For example, the string "siteoverview.overview.title.merchant.tools" is an identifier, and the "Merchant Tools" is the text that is to be localized, which corresponds to the identifier. The markup language in the second web page 220 is shown in a way that disrupts the page and changes the appearance of the page. For example, the markup language may change the sizes of the headers on the second web page 220, such as the size of the "Merchant Tools" header. The markup language in the second web page 220 may ultimately interfere with the business management tool in the second web page 220. In some cases, the markup language may disrupt the styling by injecting additional markup to the web page, or changing the appearance of the web page (e.g., changing text colors, highlight text, etc.) or interfering with the Cascading Style Sheet (CSS) (e.g., the language used for presentation of the web page) of the application.

Thus, the localization tool 104 may be used to provide non-obtrusive markup augmentation of websites. In order to provide a non-obtrusive markup, the localization tool 104 may create localization descriptors for localized elements on a website. Localization descriptors may include key and value pairs corresponding to localized elements on the website and bundle information indicating locations of each key and value pairs. For example, if a website is translated from English language to German language during a website localization, a localization descriptor may indicate each element that was localized on the website, the corresponding English and German texts, and the location of where the translations are from (e.g., a file name).

In this disclosure, key and value pairs may be referred to herein as key-value information. In some embodiments, a key and value pair may indicate from which key does a value originate and which value was translated to what. In some embodiments, the bundle information may include the location from where the key-value information was taken. For example, a localization descriptor may be represented in JSON or in another suitable human-readable and machine interpretable format. While localization descriptors may take various forms within the context of this disclosure, examples of information in a localization descriptor is displayed below, such as if a website is translated from the English language to the German language during a website localization:

```
{
  "key" : "article.headline",
  "value_from" : "English article headline",
  "value_to" : "Deutsche Artikel Überschrift",
  "bundle" : "/my/package/editorial.properties"
}
```

The localization tool 104 may encode the localization descriptors into unparsed syntax in program code 108 for the website. In some embodiments, the program code 108 may include a markup language, such as Hypertext Markup Language (HTML), Extensible Markup Language (XML), Standard Generalized Markup Language (SGML), or another markup language. In some embodiments, the program code 108 may comprises HTML, and the localization tool 104 may encode the localization descriptors into unparsed syntax, such as using HTML comments. In some embodiments, the localization tool 104 may encode a localization descriptor by using the following notation: <!--{ . . . }-->

The localization tool 104 may then expand an HTML comment by adding opening and closing pseudo tag notations. In some embodiments, the opening and closing pseudo tag notations may indicate starting and ending points, respectively, for the text that is being translated/localized. In some embodiments, the opening and closing pseudo tag notations may be referred to as a pseudo tag pair. In some embodiments, the localization tool 104 may add pseudo tag notations to the localization descriptor encoded in the unparsed syntax by using the following notation:

<!--[translatable-start]{ . . . }--><!--[translatable-end]-->

In some embodiments, the localization descriptor and the localization element may be wrapped by the pseudo tags, such as by the following notation:

<!--[translatable-start]{ . . . }-->English article headline<!--[translatable-end]-->

In some embodiments, the localization tool 104 may perform server-side processing to generate and encode a localization descriptor and add pseudo tag notations, as well as performing the extraction of text and creating a visual indicator for display. In additional or alternative embodiments, the localization application 126 in the client device 120 may perform the extraction of text and creation of a visual indicator for display, instead of the localization tool 104 performing these steps. In some embodiments, the localization application 126 may then identify a size of the text that is being localized by extracting the localization descriptor and using the pseudo tag notations. In some embodiments, the localization application 126 may combine one or more elements that reside between the opening and closing pseudo tag notations in the HTML, comment and merge their visual representations into a polygon. In some embodiments, the localization application 126 may identify the elements in the opening and closing pseudo tag notations to determine how much of the screen (as presented on a user interface of the client device 120) the localized elements use when rendering the website.

By determining how much of the screen the localized elements use, the localization application 126 may create and generate a visual indicator for display as an overlay over the text. In some embodiments, the visual indicator may correspond to the size of the text and may be displayed outside the visible area of the website. In some embodiments, the visual indicator may be scaled to match the polygon corresponding to the visual representations of the elements localized on the website. In some embodiments, the visual indicator may comprise a colored opaque background. In some embodiments, the localization application 126 may add a user interaction to the visual indicator, including at least one of showing information from the localization descriptor (e.g., when a cursor corresponding to the client device 120 is hovering over the visual indicator), highlighting the region of the displayed website corresponding to the text that is being localized, providing a user interface for user input of localized text on the website, or the like. In some embodiments, the user interaction may comprise an operation performed by the localization application 126 in response to receiving a user input from the user, such as via client device 120.

In some embodiments, encoding localization descriptors into unparsed syntax, such as in HTML comments, may provide a non-obtrusive markup augmentation of the website for various reasons. In particular, HTML comments might not interfere with the CSS of a webpage. In some embodiments, HTML comments may be valid in any position of the website markup, and they may be invisible elements. In some embodiments, localized elements on a website may likely contain multiple HTML elements within itself, and pseudo opening and closing tag notations may virtually wrap any portion of the website. In some embodiments, visual indicators may interact with the original website markup, but may remain separate from the markup. In some embodiments, the visual indicators are displayed outside of the visible website area so that it cannot cause visual side effects or disruptions to the website.

FIG. 3 is a diagram illustrating an example 300 of a non-obtrusive localization markup of a web page performed by the localization application 126, according to some embodiments. FIG. 3 illustrates a first web page 310 showing text that is to be translated and a second web page 320 showing the translated text. The first web page 310 is rendered without any markup and shows an example of a web page that can be localized for different translations, such as English, German, or other languages. The second web page 320 shows a non-obtrusive markup of the translated text, as performed by localization tool 104.

The second web page 320 includes a visual indicator 324 and a visual indicator 326. The visual indicators 324 and 326 are generated by the localization application 126 and may be displayed as overlays over different texts on the second web page 320. In some embodiments, visual indicator 324 may be an overlay over the localized text. In some embodiments, visual indicator 324 may highlight or accentuate a change in appearance on the second web page 320 so that the user is made aware of the changes on the second web page 320 after localization. In some embodiments, the visual indicator 324 may highlight or accentuate a translated/localized text on the second web page 320 to indicate a change in size of the localized text when translated from a first language to a second language. In some embodiments, a change in size of the localized text may comprise a change in the length of the text. For example, the length of the text may become longer or shorter when translated from a first language to a second language. Thus, the visual indicator 324 may highlight this change in size by providing an overlay on the second web page 320.

In some embodiments, visual indicator 326 may be a second overlay that is displayed over other text on the second web page 320 that may have shifted as a result of the change in appearance of the localized text. For example, the change in size of the localized text may cause the other text on the second web page 320 to shift down on the page. Thus, the visual indicator 326 may indicate this shift by highlighting the portion of the second web page 320 that has shifted. In some embodiments, a user may easily identify the changes in the appearance of the second web page 320 after localization by viewing the visual indicators 324 and 326. In some embodiments, the localization application 126 may generate either visual indicators 324 or 326 or both visual indicators 324 and 326 for display over portions of the second web page 320. In some embodiments, the visual indicators 324 and 326 may not affect the style of the second web page 320 itself or change the content of the second web page 320 displayed, but rather the visual indicators 324 and 326 are displayed as overlays to indicate a change in appearance of the second web page 320 after localization to a user.

In some embodiments, the second web page 320 may also include an identifier 328 that is displayed underneath the localized text. The identifier 328 may represent a user interaction that is added to the visual indicator 324 by the localization application 126. In some embodiments, a user may operate a cursor (e.g., of a mouse connected to client device 120) to hover over and/or click on the visual indicator 324. Upon receiving this user input from the client device 120, the localization application 126 may generate identifier 328, which provides a key or identifier of the localized text that is shown underneath the visual indicator 324. In some embodiments, a user may employ identifier 328 to look up a corresponding translation file and provide changes for the translated text.

In addition to non-obtrusive markup augmentation, the localization application 126 may provide on-the-fly text replacements for a user of the client device 120, using the corresponding localization application 126. In some embodiments, a targeted localized text section on a website may be replaceable using the localization application 126, without the need to reload the website nor follow any formal deployment processes to let the website ingest the given translations. In some embodiments, a user may employ a user interface provided by the localization tool 104 through the localization application 126 to modify localized texts or correct translations on the website on-the-fly, without the need for passing a corresponding resource bundle, system processing, and re-rendering of the website. In some embodiments, the user may stay on a website and provide localized texts targeted to a specific key element on the website through a user interface of the localization application 120. In some embodiments, the localization application 120 may allow users to edit localized text in a form that resembles its appearance when displayed on the rendered website, so that users may see how websites may take on translations and edits made to localized texts.

In some embodiments, for localization ingestion, the localization application 126 may allow a user to read key-values from bundles (e.g., stored in database 110), including selecting resource bundle files and manually entering key-value information. In some embodiments, the localization application 126 may allow a user to perform pre-processing of key-values, such as applying spell checks, applying AI-based algorithms to identify translation issues, and sanitizing information by securing/encoding information, stripping scripts, and the like. In some embodiments, the localization application 126 may also allow a user to identify corresponding pseudo tags including updating localization descriptors and replacing inner values and redraw visual indicators.

In some embodiments, for localization extraction, the localization application 126 may allow a user to create an export bundle and add key-value pairs to export bundles for each pseudo tag.

Figure 4:
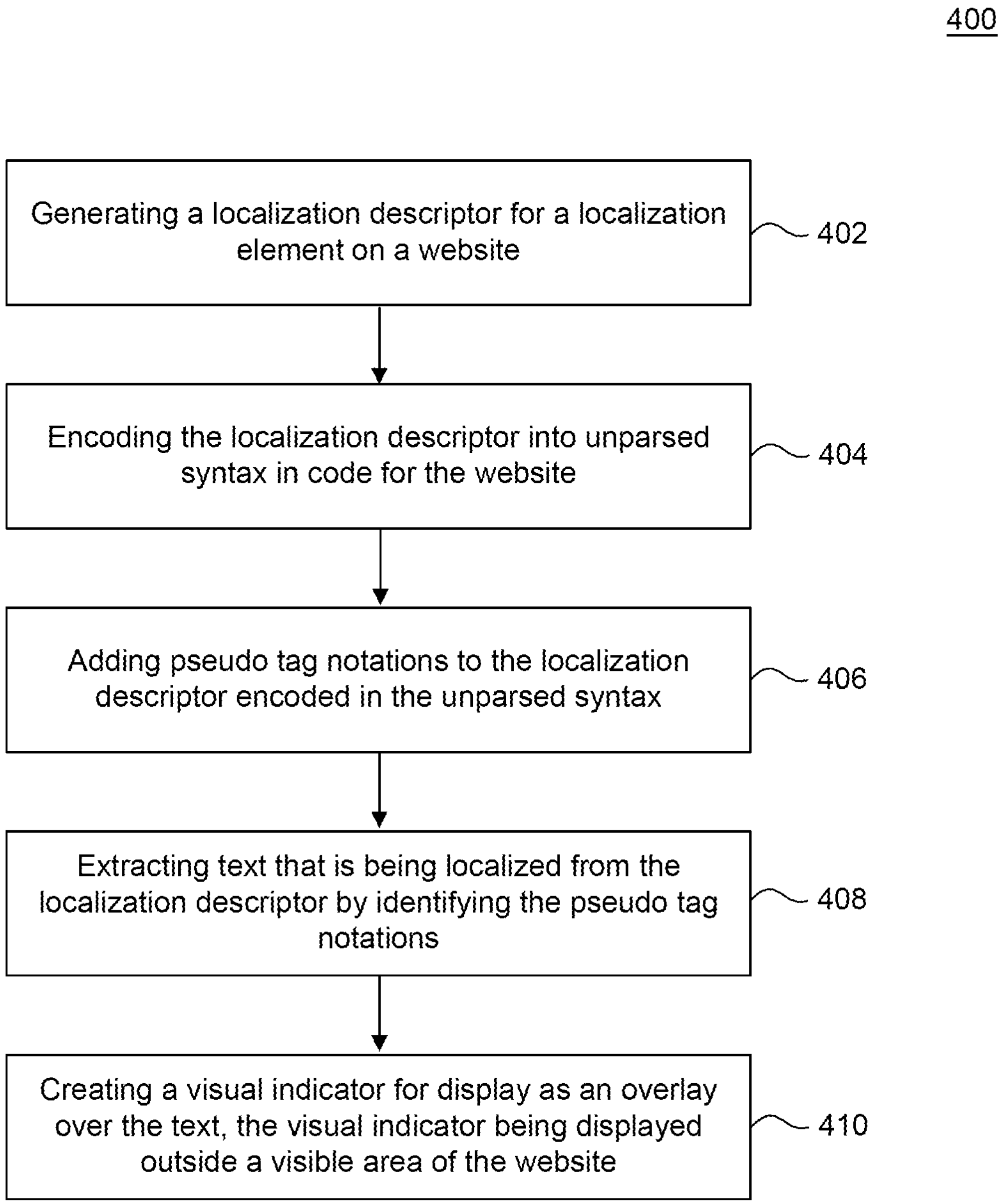
FIG. 4 illustrates a method for performing a non-obtrusive markup of a website using the localization tool, according to some embodiments.

FIG. 4 illustrates a method 400 for performing a non-obtrusive markup of a website using the localization tool, according to some embodiments. Method 400 may be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art(s).

In 402, the localization tool 104 may generate a localization descriptor for a localization element on a website. In some embodiments, the localization descriptor includes a key and value pair corresponding to the localization element and bundle information indicating a location of the key and value pair.

In 404, the localization tool 104 may encode the localization descriptor into unparsed syntax in code for the website. In some embodiments, the unparsed syntax may include a Hypertext Markup Language (HTML) comment and the code for the website may be HTML code, such as in program code 108.

In 406, the localization tool 104 may add pseudo tag notations to the localization descriptor encoded in the unparsed syntax. In some embodiments, the pseudo tag notations may include an opening pseudo tag notation and a closing pseudo tag notation. In some embodiments, the opening and the closing pseudo tag notations may indicate a starting point and an ending point, respectively, for text that is being localized in the localization element.

In 408, the localization application 126 may extract text that is being localized from the localization descriptor by identifying the pseudo tag notations. In some embodiments, the localization application 126 may extract the text and identify the size of the text that is being localized from the localization descriptor. In some embodiments, the size of the text that is being localized may correspond to dimensions of a region of the website displayed when the HTML code is rendered In 410, the localization application 126 may create a visual indicator for display as an overlay over the text. In some embodiments, the visual indicator may be displayed outside a visible area of the website. In some embodiments, a size of the visual indicator may be scaled to match a size of the text as displayed in the visible area of the website when the code is rendered. In some embodiments, the visual indicator may indicate a change in appearance of the website after localization. In some embodiments, the change in appearance of the website may represent a change in a length of the text that is being localized, and the visual indicator may show the change in the length of the text to a user of the website.

In some embodiments, the localization application 126 may add a user interaction to the visual indicator on the displayed website in response to receiving a user input. In some embodiments, the user interaction may be at least one of showing information from the localization descriptor, highlighting a region of the displayed website corresponding to the text that is being localized, or providing a user interface for user input of localized text on the website Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 508, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Figure 5:
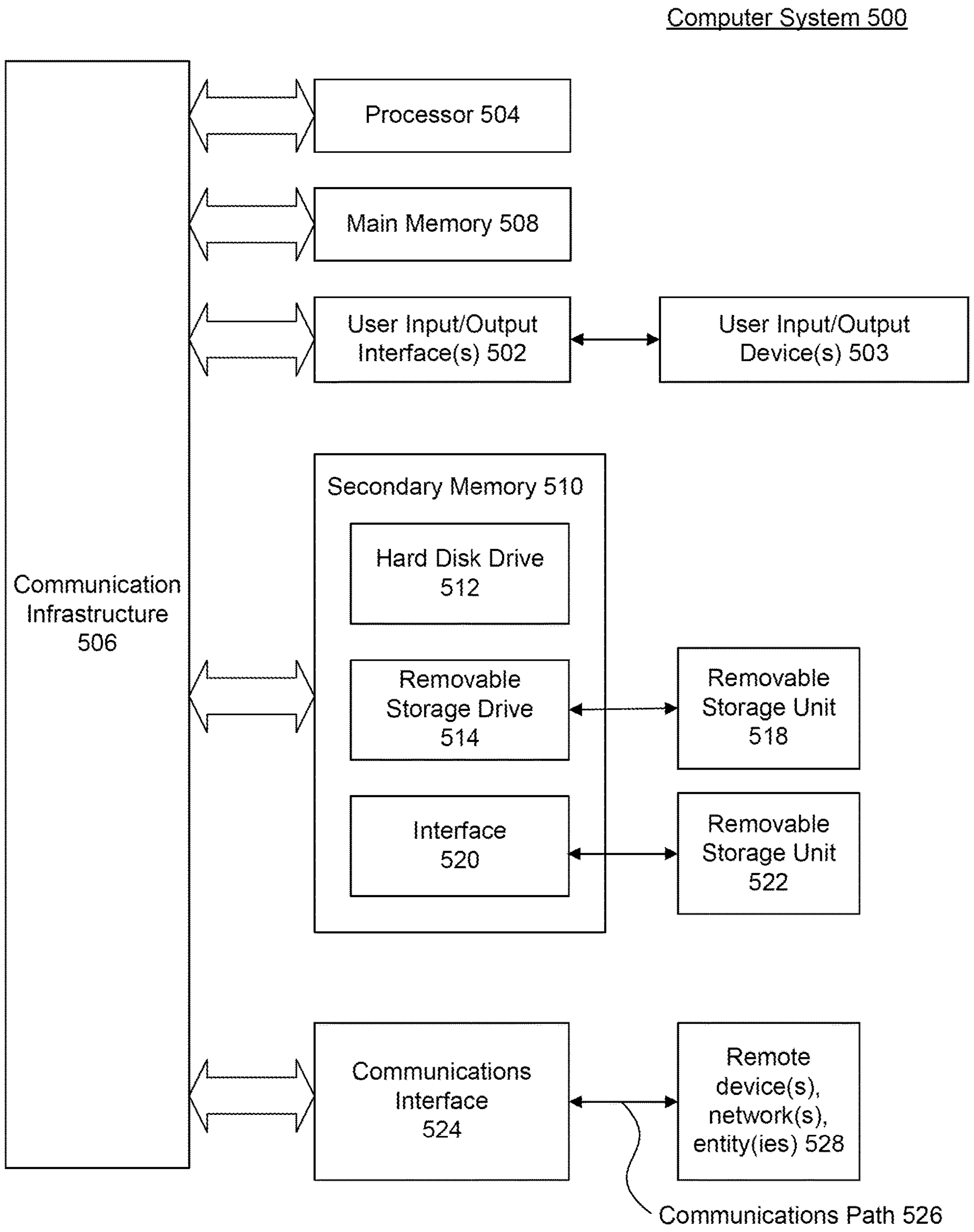
FIG. 5 illustrates a computer system, according to exemplary embodiments of the present disclosure.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:

generating, by at least one processor, a localization descriptor for a localization element on a website;

encoding, by the at least one processor, the localization descriptor into unparsed syntax in code for the website;

adding, by the at least one processor, pseudo tag notations to the localization descriptor encoded in the unparsed syntax;

extracting, by the at least one processor, text that is being localized from the localization descriptor by identifying the pseudo tag notations;

creating, by the at least one processor, a visual indicator for display as an overlay outside of a visible area of the website to indicate a change in appearance of the website after localization, wherein a size of the visual indicator is scaled to match a size of the text as displayed in the visible area of the website when the code is rendered, and wherein the visual indicator indicates a visual comparison of a change in size of the text that is being localized;

adding, by the at least one processor, a user interface to the visual indicator, also displayed outside of the visible area of the website, for user input of localized text responsive to a user interaction with the visual indicator on the website, a size of the localized text being scaled to match the size of the text as displayed in the visible area of the website; and adding, by the at least one processor, an identifier to the visual indicator, displayed in conjunction with the localized text responsive to a user interaction with the visual indicator on the website, wherein the localized text is editable through a lookup of the identifier.

2. The method of claim 1, wherein the localization descriptor comprises a key and value pair corresponding to the localization element and bundle information indicating a location of the key and value pair.

3. The method of claim 1, wherein the unparsed syntax comprises a Hypertext Markup Language (HTML) comment and the code for the website comprises HTML code.

4. The method of claim 1, wherein the pseudo tag notations comprise an opening pseudo tag notation and a closing pseudo tag notation, wherein the opening and the closing pseudo tag notations indicate a starting point and an ending point, respectively, for text that is being localized in the localization element.

5. The method of claim 1, wherein the change in appearance of the website comprises a change in a length of the text that is being localized, and wherein the visual indicator shows the change in the length of the text to a user of the website.

6. The method of claim 3, further comprising:

identifying, by the at least one processor, the size of the text that is being localized from the localization descriptor, wherein the size of the text that is being localized corresponds to dimensions of a region of the website displayed when the HTML code is rendered.

7. The method of claim 1, further comprising:

adding, by the at least one processor, a user interaction to the visual indicator in response to receiving a user input, wherein the user interaction comprises at least one of showing information from the localization descriptor or highlighting a region of the visible area of the website corresponding to the text that is being localized.

8. A system comprising:

a memory; and a processor coupled to the memory, wherein the processor is configured to:

generate a localization descriptor for a localization element on a website;

encode the localization descriptor into unparsed syntax in code for the website;

add pseudo tag notations to the localization descriptor encoded in the unparsed syntax;

extract text that is being localized from the localization descriptor by identifying the pseudo tag notations;

create a visual indicator for display as an overlay outside of a visible area of the website to indicate a change in appearance of the website after localization, wherein a size of the visual indicator is scaled to match a size of the text as displayed in the visible area of the website when the code is rendered, and wherein the visual indicator indicates a visual comparison of a change in size of the text that is being localized;

add a user interface to the visual indicator, also displayed outside of the visible area of the website, for user input of localized text responsive to a user interaction with the visual indicator on the website, a size of the localized text being scaled to match the size of the text as displayed in the visible area of the website; and add an identifier to the visual indicator, displayed in conjunction with the localized text responsive to a user interaction with the visual indicator on the website, wherein the localized text is editable through a lookup of the identifier.

9. The system of claim 8, wherein the localization descriptor comprises a key and value pair corresponding to the localization element and bundle information indicating a location of the key and value pair.

10. The system of claim 8, wherein the unparsed syntax comprises a Hypertext Markup Language (HTML) comment and the code for the website comprises HTML code.

11. The system of claim 8, wherein the pseudo tag notations comprise an opening pseudo tag notation and a closing pseudo tag notation.

12. The system of claim 11, wherein the opening and the closing pseudo tag notations indicate a starting point and an ending point, respectively, for text that is being localized in the localization element.

13. The system of claim 10, wherein the processor is further configured to:

identify the size of the text that is being localized from the localization descriptor, wherein the size of the text that is being localized corresponds to dimensions of a region of the website displayed when the HTML code is rendered.

14. The system of claim 8, wherein the processor is further configured to:

add a user interaction to the visual indicator in response to receiving a user input, wherein the user interaction comprises at least one of showing information from the localization descriptor or highlighting a region of the visible area of the website corresponding to the text that is being localized.

15. A non-transitory computer-readable device having instructions stored thereon that, when executed by at least one computing device, cause the at least one computing device to perform operations comprising:

generating a localization descriptor for a localization element on a website;

encoding the localization descriptor into unparsed syntax in code for the website;

adding pseudo tag notations to the localization descriptor encoded in the unparsed syntax;

extracting text that is being localized from the localization descriptor by identifying the pseudo tag notations;

creating a visual indicator for display as an overlay outside of a visible area of the website to indicate a change in appearance of the website after localization, wherein a size of the visual indicator is scaled to match a size of the text as displayed in the visible area of the website when the code is rendered, and wherein the visual indicator indicates a visual comparison of a change in size of the text that is being localized;

adding a user interface to the visual indicator, also displayed outside of the visible area of the website, for user input of localized text responsive to a user interaction with the visual indicator on the website, a size of the localized text being scaled to match the size of the text as displayed in the visible area of the website; and adding an identifier to the visual indicator, displayed in conjunction with the localized text responsive to a user interaction with the visual indicator on the website, wherein the localized text is editable through a lookup of the identifier.

16. The non-transitory computer-readable device of claim 15, wherein the localization descriptor comprises a key and value pair corresponding to the localization element and bundle information indicating a location of the key and value pair.

17. The non-transitory computer-readable device of claim 15, wherein the unparsed syntax comprises a Hypertext Markup Language (HTML) comment and the code for the website comprises HTML code.

18. The non-transitory computer-readable device of claim 15, wherein the pseudo tag notations comprise an opening pseudo tag notation and a closing pseudo tag notation.

19. The non-transitory computer-readable device of claim 18, wherein the opening and the closing pseudo tag notations indicate a starting point and an ending point, respectively, for text that is being localized in the localization element.

20. The non-transitory computer-readable device of claim 17, the operations further comprising:

identifying the size of the text that is being localized from the localization descriptor, wherein the size of the text that is being localized corresponds to dimensions of a region of the website displayed when the HTML code is rendered.

* * * * *